Sept. 13, 1966   C. H. WAINWRIGHT   3,272,294
DRIVING MECHANISM OF KNITTING MACHINES
Filed Sept. 2, 1964   3 Sheets-Sheet 2

United States Patent Office 3,272,294
Patented Sept. 13, 1966

3,272,294
DRIVING MECHANISM OF KNITTING
MACHINES
Carlyle Herbert Wainwright, Leicester, England, assignor
to The Bentley Engineering Company Limited, Leicester, England
Filed Sept. 2, 1964, Ser. No. 393,975
Claims priority, application Great Britain, Sept. 4, 1963,
34,915/63; July 23, 1964, 29,218/64
8 Claims. (Cl. 192—66)

This invention is concerned with knitting machines. It is particularly concerned with a means for transmitting the drive to such machines in a manner which allows the drive to be interrupted in as short a time as possible, and is primarily concerned with circular knitting machines.

It has been the practice to drive knitting machines by means of a belt. This has the advantage that it is simple to change the speed, merely by shipping the belt from one pulley to another. Also, in the event of malfunction of the knitting mechanism which could cause a locking of the working parts, the belt can slip on the pulley and thus reduce the risk of increased damage to the machine. In order to stop the machine the belt is shipped to an idle pulley. This involves a delay, however, particularly with machines having two or three speed change pulleys.

The present invention provides, in or for a knitting machine, a driving mechanism comprising an input member to which the drive is applied from a suitable driving source (which for example is an electric motor), an output member from which the drive is applied to the rotating parts of the machine, a friction clutch interposed between the input and output members and means for controlling said clutch. Thus, in a combination wherein the output member is a belt pulley, the usual idle pulley is dispensed with and the friction clutch permits the machine to be stopped with rapidity and with little effort, thus increasing the efficiency of the stop motion elements commonly provided for this purpose. Desirably, there is a power-operated clutch-release means operable, under control of an attendant and/or a fault detector, by a rotatable member of the driving mechanism.

The clutch release means conveniently comprises a rotatable toothed wheel constituting the said rotatable member and arranged when the clutch is engaged to rotate with one of the clutch parts, and a catch lever having a portion engageable with the toothed wheel and arranged when so engaged to be moved to effect release of the clutch. The clutch may comprise co-operating rotatable driving and driven friction members between which relative axial movement is permitted to occur to engage and dis-engage the clutch, and a screw-threaded abutment member when turned appropriately moves one friction member towards the other, and the catch lever aforesaid may be mounted on said abutment member so that the latter is turned by power to release the clutch when the catch lever is caused to engage with the toothed wheel.

There may be spring means acting on the said screw threaded abutment member to tend to turn it towards the clutch releasing position, latching means for holding the abutment member in clutch-engaging position against the action of the spring means, and means for releasing the latching means when the clutch is to be released.

The rotary clutch parts may be mounted on a fixed shaft and the screw threaded abutment member may have screw threaded engagement with a sleeve mounted on said shaft and held against rotation thereon. Said sleeve may be adjustable along the shaft to vary the setting of the clutch parts.

The foregoing and other provisions of the invention are incorporated in a convenient form of clutch mechanism which is illustrated by way of example in the accompanying drawings and will now be described with reference to the drawings in which.

Figure 1:
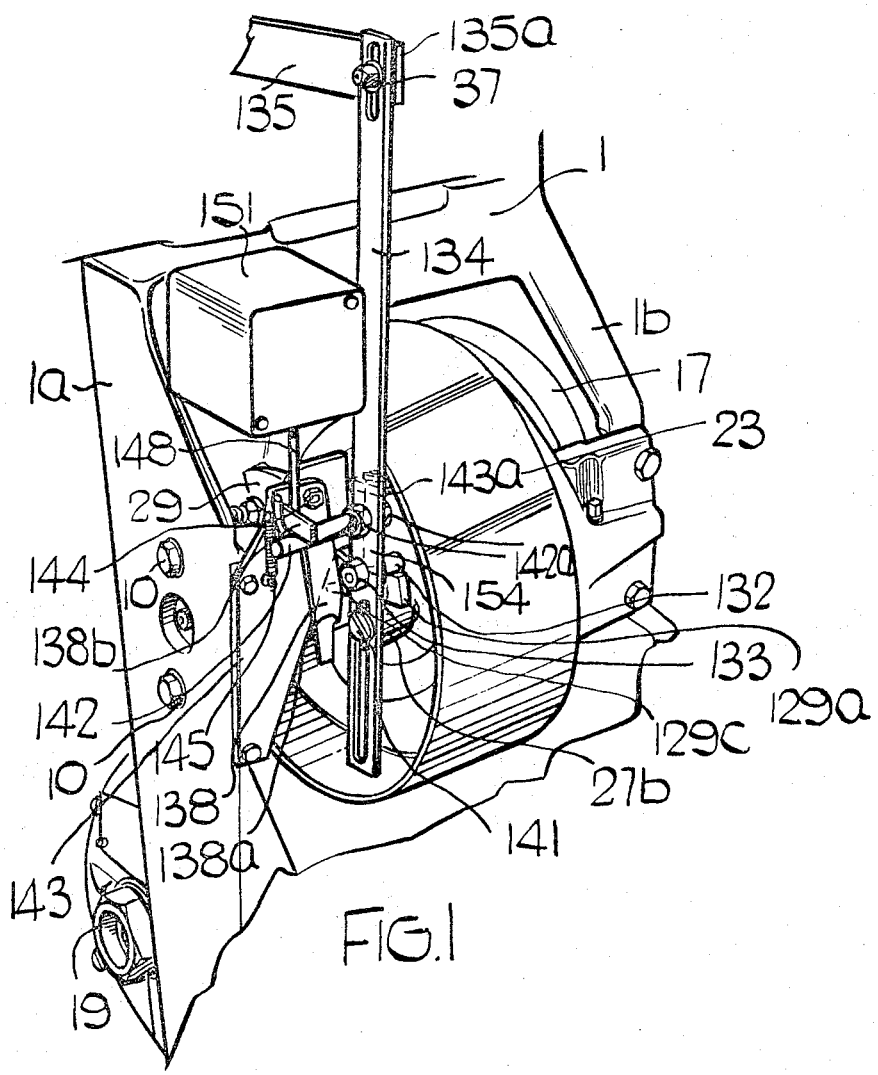
FIGURE 1 is a perspective view looking from the back of a knitting machine showing the general arrangement of the clutch and pulley assembly together with the trip mechanism for operating the clutch plates.
Figure 4:
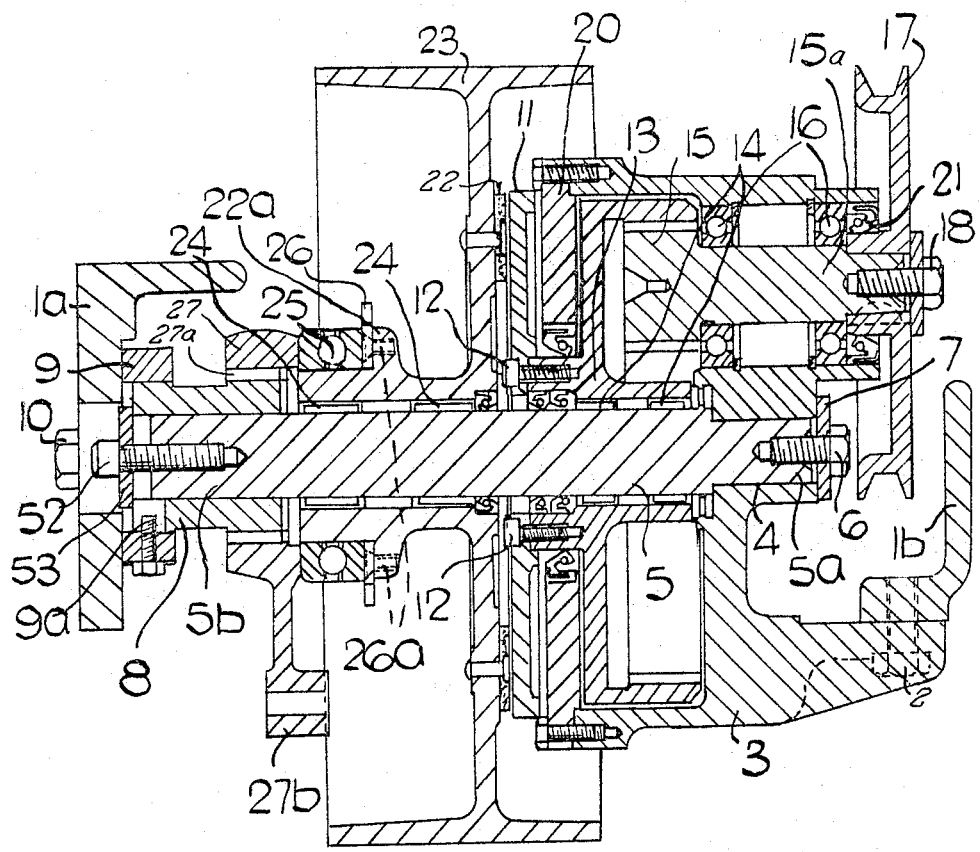
FIGURE 4 is a sectional plan view of the clutch and drive mechanism.

As can be seen in FIGURE 1 the pulley and clutch assembly is carried by the rear left unit 1 which forms parts of the base or stand for a circular knitting machine. The upper part of the machine has been omitted from the drawings for the sake of simplicity. It is sufficient to realise that an endless belt transmits the drive from the pulley 23 (the output member aforesaid) to a set of speed change pulleys situated above the said pulley. The belt is shipped from one pulley of this set to another to change the speed of the machine and so pulley 23 is made wide enough to allow for this. By providing a clutch drive to pulley 23 the drive may be interrupted regardless of the position of the belt. If reference is made to FIGURE 4 the various items forming the pulley and clutch assembly can be seen in section. The two side members 1a and 1b of the leg unit 1 are shown. Attached by screws 2 to the side member 1a is a gear housing 3 which has a central bore 4. A shaft 5 having a spigot 5a is secured in the central bore by a screw 6 and washer 7. The other end 5b of the shaft is located in a sleeve-like member 8 which is itself slidably located in a bearing plate 9 secured by screws 10 to the side member 1a (FIGURES 1 and 4). The sleeve member 8 is prevented from rotating by means of a key screw 9a. Located in a slot formed in the end of the sleeve. Thus there is provided a stationary shaft 5 upon which the pulley and clutch components are mounted in the following manner.

Consider first the constantly revolving (driving) side of the clutch assembly. The clutch plate 11 is secured by screws 12 to the hub of an internal gear 13 as shown in FIGURE 4. The gear 13 is mounted on roller bearings 14 and it has internally cut teeth which are meshed with and are driven by a pinion 15 which is formed with an integral stub spindle 15a. Spindle 15a is carried by bearings 16 which are conveniently mounted in the aforementioned gear housing 3. The pinion 15 is driven by a pulley 17 (the input member aforesaid) which is keyed to a spigot formed on the end of spindle 15a and is clamped by a screw 18 provided with a washer. The pulley 17 is also shown in FIGURE 1. It is driven through a V-belt by a motor 19 which is attached to the leg unit 1. To enable the gears to run in oil a cover plate 20 and various oil seals such as 21 are provided to seal the gear housing 3.

The mechanism associated with the driven side of the clutch will now be described. The friction plate 22 is riveted to the flat disc of pulley 23 which is mounted on roller bearings 24. The hub of the pulley outwardly of the flange 22a thereon is machined to provide a location for a thrust race 25 and a toothed "sprag wheel" 26 which is secured by screws 26a to the flange 22a of the pulley. In contact with the thrust race 25 there is a screw threaded abutment member formed by a component 27 having a course screw thread 27a which is engaged with a thread formed on the outside of the aforementioned sleeve-like member 8. Component 27 is provided with an arm 27b by which it can be partially rotated about member 8 either to apply pressure to, or to remove pressure from, the thrust race 25.

Figure 2:
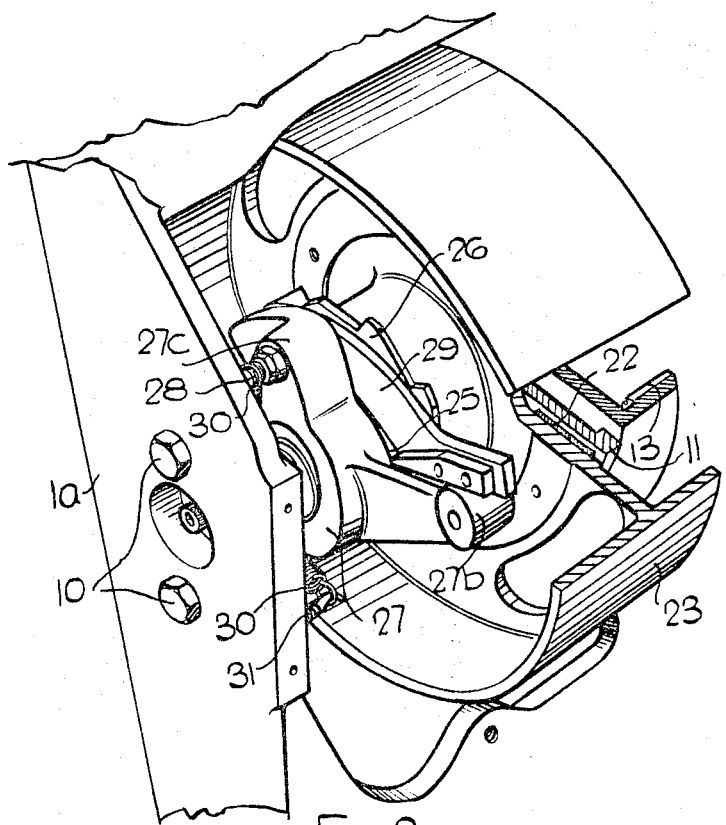
FIGURE 2 is a perspective view, partly in section, of the clutch assembly with the trip mechanism removed.

If reference is made to FIGURE 2 the parts just mentioned can be seen in perspective. The pulley 23 is cut away to show the clutch plates and internal gear 13 and certain parts have been removed for clarity.

Component 27 is provided with a lug 27c which has a pin 28 serving the double purpose of fulcrum for a catch lever 29 and anchorage for a tension spring 30. The other end of spring 30 is anchored to a hook 31 screwed into the side 1a of the leg unit. The spring is provided to urge the component 27 around the sleeve member 8 thus unwinding component 27, like a nut, to withdraw it from the thrust race 25.

From the above it will be realised that partial rotation of the component 27, in the clockwise direction (FIGURES 1–3) will apply pressure through the thrust race 25 and sprag-wheel 26 to force the friction plate 22 into contact with the driving plate 11 thus causing the pulley 23 to rotate. Partial rotation of component 27 in the opposite direction, i.e. the spring assisted direction, will remove pressure from the thrust race and allow the clutch plates to slip. The braking action of the belt and knitting machine pulleys causes the drive to be interrupted immediately as the pressure is removed. The controls for operating the component 27 to start and stop the drive will now be described.

In the position shown in FIGURE 1 the arm 27b is in contact with the underside of the end 129a of catch lever 29. The upper surface of the end 129a is itself in contact with a stop pin 154 which is secured in a projection 143a of plate 143 which is itself fixed to leg 1a. Just above the catch lever end 129a can be seen in FIG. 1 a horizontal rod 132 secured by a nut 133 to a vertical control bar 134. The upper end of this bar is secured by a nut and bolt 37 to a swivel joint (pin or bush) on an end 135a of a lever 135 which extends from the front of the machine to the back. To engage the clutch plates the lever 135 is lifted at the front of the machine, thus depressing the end 135a and vertical bar 134 so that abutment rod 132 depresses the end 129a of the catch lever 29 and through it the arm 27b. The catch lever is thereby rocked about the pin 28 to a position wherein its end 129b is clear of the teeth of the sprag wheel 26. This depression of the vertical control bar 134 causes the end 129a of catch lever 29 to press on to the arm 27b (FIGS. 1 and 3) thus rotating component 27 to the "load" position. It should be realised that the vertical bar 134 is not fixed to arm 27b, but is anchored thereto by a shoulder screw 141 fixed to arm 27b and free to slide in the slot in the bar, thereby serving to locate or guide the lower end of the bar. Rotation of component 27 continues until the clutch plates are engaged and at this stage a projection 129c on the catch lever 29 is so positioned as to be engaged by a step 138a of a catch plate 138. This catch plate is pivoted at 144 on a plate 143 secured to the leg 1a and a spring 145 is provided to urge the catch plate 138 into engagement with the projection 129c. The catch lever 29 is thus held clear of the sprag wheel and is latched to prevent member 27 from rotating in the anti-clockwise direction and to prevent the clutch plates disengaging. The lever 135 can then be released so that it together with the bar 134 will return to the positions they are shown to occupy in FIGURE 1, raising movement of the bar 134 being permitted by free movement of the shoulder screw 141 along the slot of the bar.

Disengagement of the clutch plates may be effected either manually, or automatically, the latter method operating in the event of any of the stop motion mechanisms commonly provided in knitting machines detecting a fault in the running of the machine.

Manual disengagement is effected by hand lever 135 as follows.

Figure 3:
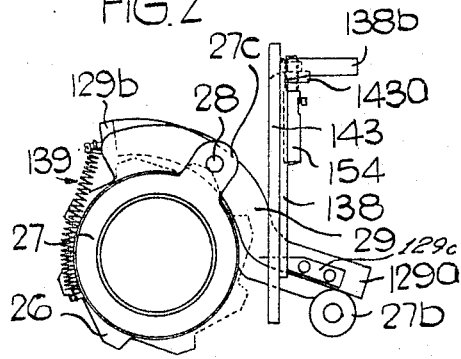
FIGURE 3 is a view showing in detail certain parts of the trip mechanism.

In order to interrupt the drive, the hand lever 135 is depressed at the front of the machine, thus lifting the end 135a of the lever and with it the vertical control bar 134. This action causes a horizontal rod 142 secured in bar 134 by nuts 142a to contact a projection 138b of catch plate 138 and swivel the catch plate in a clockwise direction to release the end 129a of the catch lever (FIG. 1). This upward movement of the bar 134 has no effect on component 27 because the bar is free to move relatively to component 27 by virtue of the shoulder screw 141 sliding in the slot. However, actuation of the catch plate 138 releases the catch lever 29 so that its cranked end 129b is drawn into the teeth of the sprag wheel by tension spring 139 (FIG. 3). The sprag wheel is rotating in the anti-clockwise direction together with the pulley 23 to which it is attached. The catch lever 29 is dragged round with the sprag-wheel, thus rotating component 27 on its thread 27a to remove pressure from the clutch plates. As soon as the frictional grip of the clutch is broken, the tension spring 30 assists the rotation of component 27 to the position shown in FIG. 2, where the aforementioned stop pin 154 (FIGS. 1 and 3) acts first upon the catch lever end 129a (as the component 27 is rotated) to disengage end 129b from the sprag wheel tooth and then acts through the catch lever end 129a and arm 27b to stop rotation of component 27.

Automatic disengagement of the clutch is similarly obtained by actuation of the catch plate 138, but in this case the actuating movement is initiated by a link 148 associated with a control box 151. The control box has solenoid means responsive to electrical impulses obtained from fault detectors associated with the yarn or the knitting elements. Upon a fault being detected the link 148 is raised, thus operating the catch plate 138 (through projection 138b) as just described.

Important features of the invention are the very small force required to initiate disengagement of the clutch and the compact arrangement of the three main assemblies viz., the clutch unit, motor drive and controls, both manual and automatic. Another feature is the ability to adjust the clutch to obtain the minimum engaging pressure. This adjustment may be carried out while the motor 19 is running, in the following manner.

If reference is made to FIGURE 4, a screw 52 can be seen inserted in that end of the shaft 5 which is located in the threaded sleeve 8. A washer 53 is positioned between the head of the screw and the end face of the sleeve 8. By tightening the screw, the pressure is applied to the washer so that the sleeve 8 is moved (to the right in FIGURE 4) along the shaft 5 carrying with it the nut-like component 27. Thus, if tightening of the screw is continued sufficiently the clutch plate 22 will be forced into contact with the plate 11. This form of adjustment permits the conrol bar 134 to be depressed until the projection 129c of the catch lever is nicely engaged with the step 138a of the catch plate, then, with the motor running the screw 52 (FIG. 4) is tightened just sufficiently to effect engagement of the clutch plates without slip. When this has been done any excess loading of the pulley 23 due to a fault in the knitting machine, will cause the plates to slip, and minimise damage to the machine. It may be mentioned that the adjusting screw 52 is a special type provided with a friction device to prevent it unscrewing when subject to vibration.

It will be realised that various details of construction of the clutch mechanism may be modified, if desired, when practising the invention. For example, the toothed sprag wheel 26 need not be fixed to the pulley 23 but merely gripped against the shoulder 22a of the pulley by the pressure of the screw-threaded component 27 during clutch engagement. In this case it would be unnecessary to disengage the clutch lever 29 positively from the sprag wheel 26 on release of the clutch. Further, the precise forms and arrangements of the clutch actuating and releasing means 134 and 148 may be varied to suit particular requirements.

What I claim is:

1. A knitting machine driving mechanism comprising a rotatable input member, a rotatable output member, a friction clutch comprising co-operating driving and driven rotatable friction members coupled respectfully to said input and output members, means mounting said output and input members and said driving and driven friction members for rotation and for movement of one of the friction members axially into and out of engagement with the other, a screw threaded abutment co-operating with the axially movable friction member, a screwed mounting on which said abutment member is carried in screw-threaded engagement so that when the abutment member is turned appropriately the axially movable friction member is urged towards the other friction member to engage the clutch, a rotatable member coupled to one of said input and output members to rotate therewith in a direction appropriate for turning the abutment member to release the clutch, and a catch lever carried by said abutment member and movable into and out of engagement with said rotatable member, wherein said rotatable member is a toothed wheel and the catch lever is provided with an end portion engageable with the teeth of the toothed wheel.

2. Mechanism according to claim 1 comprising spring means acting on said screw threaded abutment member so as to urge it to turn towards the clutch releasing position, latching means for holding the abutment member in clutch-engaging position against the action of said spring means, and means for releasing the latching means to uncouple the clutch.

3. Mechanism according to claim 2 wherein the latching means co-operates with the catch lever on the abutment member.

4. Mechanism according to claim 3 comprising a catch plate constituting the said latching means, and having the catch lever provided with a part at one end to engage with the said rotatable member and a part at its opposite end to engage with the catch plate, and having means pivoting the catch lever between its ends to the abutment member.

5. Mechanism according to claim 4 having the catch plate provided with a projection to co-operate with both manually operable and fault operated stopping devices for actuation thereby to release the clutch.

6. Mechanism according to claim 1 comprising a stationary stem member, means for mounting said stem member for endwise adjustent whilst retaining it against turning, a screw thread on said stationary stem member engaging with said screw threaded abutment member, and means for adjusting said stationary stem member endwise to adjust the setting of the clutch.

7. Mechanism according to claim 1 comprising a fixed shaft on which the driving and driven friction members are mounted to rotate, a sleeve with an external screw thread mounted on said shaft, and means retaining said sleeve against turning on said shaft, and having said screw threaded abutment member mounted on said sleeve and provided with an internal screw thread engaging with the external screw thread engaging on said sleeve, and also provided with an arm extending outwardly from the abutment member by means of which arm the abutment member may be turned on the sleeve.

8. Knitting machine driving mechanism comprising an input member, an output member constituted by a belt pulley having a central disc, means mounting said members for rotation, a friction clutch for coupling said input and output members to one another and including co-axial driving and driven friction members whereof the driven friction member is formed by a friction plate secured to the disc of the belt pulley, a rotatable member coupled to one of said input and output members to rotate therewith constituted by a toothed wheel mounted on a part of said pulley, and clutch release means operable by said rotatable member.

References Cited by the Examiner
UNITED STATES PATENTS 1,606,072 11/1926 Havener _____ 192—24 X
2,008,023 7/1935 Krag _____ 192—66

DAVID J. WILLIAMOWSKY, *Primary Examiner.*

A. T. McKEON, *Assistant Examiner.*